United States Patent

Chen et al.

[11] Patent Number: 5,633,745
[45] Date of Patent: May 27, 1997

[54] TO DRIVE THE OPTICAL SYSTEM INDEPENDENTLY BY CPU IN FLATBED SCANNERS

[75] Inventors: Daniel Chen; Alpha Tasy; Kevin Chen, all of Hsinchu, Taiwan

[73] Assignee: Umax Data System Inc., Hsinchu, Taiwan

[21] Appl. No.: 524,938

[22] Filed: Sep. 8, 1995

[51] Int. Cl.$^6$ .................................. G02B 26/08
[52] U.S. Cl. .................. 359/201; 359/209; 359/210; 359/212; 359/223; 358/474; 358/483; 358/497
[58] Field of Search ...................... 359/196, 201, 359/209–212, 223; 355/55, 57, 60, 65–67; 358/296, 474, 482–483, 487, 494, 497; 250/234–236, 208.1

[56] References Cited

U.S. PATENT DOCUMENTS

| | | | |
|---|---|---|---|
| 4,050,780 | 9/1977 | Wei et al. | 359/201 |
| 5,117,256 | 5/1992 | Haibara | 355/55 |
| 5,206,501 | 4/1993 | Sakakibara et al. | 250/208.1 |
| 5,214,294 | 5/1993 | Toyofuku | 250/234 |
| 5,535,040 | 7/1996 | Ohtsuka et al. | 359/210 |

*Primary Examiner*—James Phan
*Attorney, Agent, or Firm*—Bacon & Thomas

[57] ABSTRACT

An optical system for a flatbed scanner, including a first optical unit to emit light onto a document and to reflect the image of the document, a second optical unit to receive reflected light from the first optical unit and to reflect it, a third optical unit to receive reflected light from the second optical unit and to send it out, and a fourth optical unit to receive light from the third optical unit and to pick up the image from it, wherein the first optical unit, the second optical unit and the third optical unit can be independently moved relative to the fourth optical unit subject to a predetermined setting made in the optical scanner.

7 Claims, 3 Drawing Sheets

TO DRIVE THE OPTICAL SYSTEM INDEPENDENTLY BY CPU IN FLATBED SCANNERS

BACKGROUND OF THE INVENTION

The present invention relates to a flatbed system for flatbed scanners which consists of four optical units that can be moved relative to the image sensor to change the object distance and the image distance so as to adjust the resolution.

FIG. 1 shows the arrangement of the optical system 20 of a conventional flatbed scanner. This optical system 20 comprises a light source 101, a first reflector 102, a second reflector 103, a third reflector 104, a lens 105, and a CCD (charge-coupled device) 106. The reflectors 102–104, the lens 105 and the CCD 106 are fixed in place. When the optical scanner is operated, the optical system 20 is moved by a step motor through a transmission belt to scan the document. This optical system 20 is heavy, and therefore the power consumption problem is very serious during the operation of the optical scanner. Because the position of the optical system changes continuously during scanning, a flat cable is needed to transmit signals from the CCD 106 to the main board. In order to increase signal transmission speed, the frequency must be relatively increased. When the frequency is increased, the flat cable will cause a relatively serious radiation problem, and this radiation problem must be settled. Furthermore, because the flat cable is moved back and forth frequently, contact errors tend to occur.

SUMMARY OF THE INVENTION

The present invention has been accomplished to provide an optical system for flatbed scanners which eliminates the aforesaid drawbacks. According to the preferred embodiment of the present invention, the optical system comprises a first optical unit to emit light onto a document and to reflect the image of the document, a second optical unit to receive reflected light from the first optical unit and to reflect it, a third optical unit to receive reflected light from the second optical unit and to send it out, and a fourth optical unit to receive light from the third optical unit and to pick up the image from it, wherein the first optical unit, the second optical unit and the third optical unit can be independently moved relative to the fourth optical unit by a step motor by means of the control of the central processing unit CPU of the flatbed scanner, according to a chosen resolution in the flatbed scanner. Because the first optical unit, the second optical unit, and the third optical unit can be independently moved, less electric power is consumed during the scanning process. Because the fourth optical unit (which uses a charge-coupled device to pick up the image) is immovable, other image signal transmission cables can be used instead of a flat cable. Therefore, the radiation problem of a flat cable is eliminated.

DETAILED DESCRIPTION OF THE PREFERRED EMBODIMENT

Figure 1:
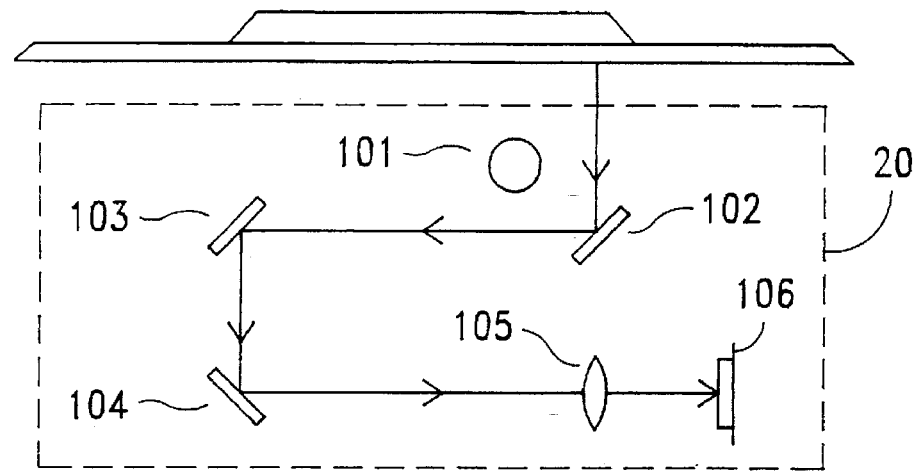
FIG. 1 shows the arrangement of an optical system for flatbed scanners according to the prior art.
Figure 2:
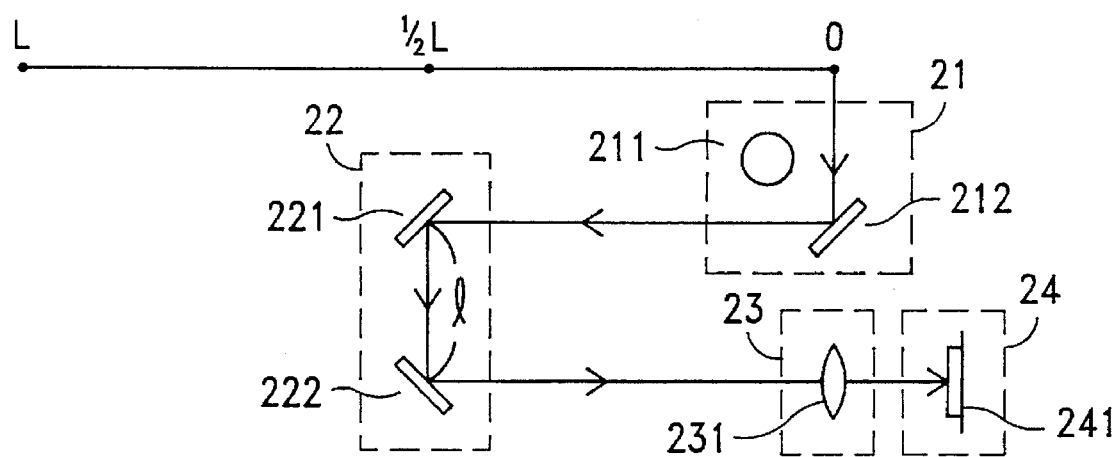
FIG. 2 shows the arrangement of an optical system for flatbed scanners according to the present invention.
Figure 3:
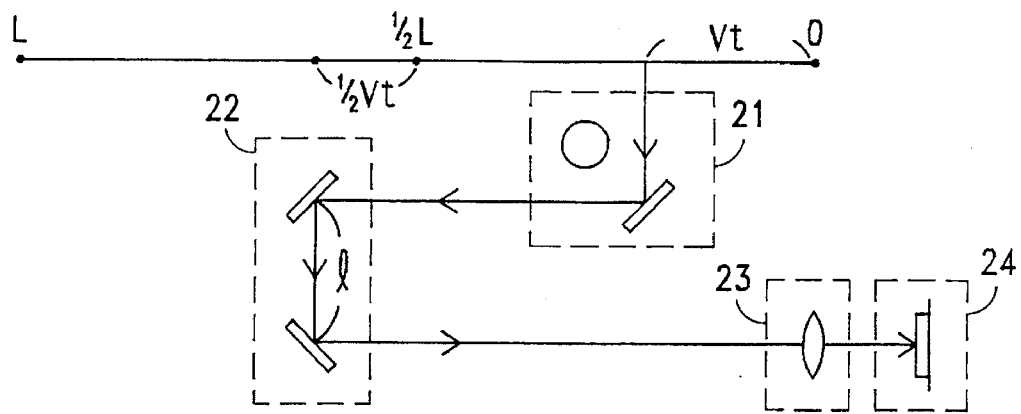
FIG. 3 shows the first optical unit and the second optical unit moved at different speeds according to the present invention.
Figure 4:
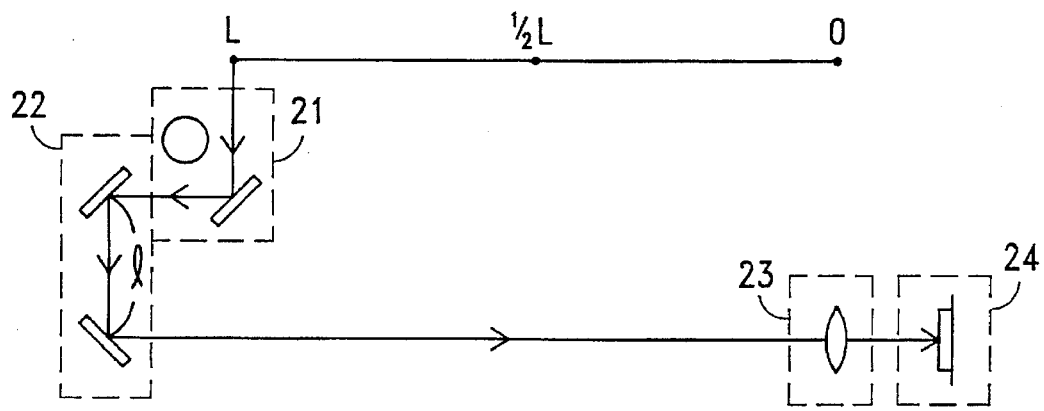
FIG. 4 shows the first optical unit and the second optical unit reaches L according to the present invention.

Referring to FIG. 2, the optical system of the present invention is comprised of four separated optical units, namely, the first optical unit 21, the second optical unit 22, the third optical unit 23, and the fourth optical unit 24. The first optical unit 21 comprises a light source 211, and a reflector 212 which reflects the image of a document. The second optical unit 22 comprises two reflectors 221 and 222 for changing the route of light and transmitting the image of the document from the first optical unit 21 to the third optical unit 23. The third optical unit 23 comprises a lens 231 which focuses the image of the document from the second optical unit 22 onto the fourth optical unit 24. The fourth optical unit 24 comprises a CCD (charge-coupled device) 241 which picks up the image of document from the third optical unit 23 and then transmits the image signal thus obtained to the central processing unit of the flatbed scanner system through a flat cable for further processing. The first optical unit 21, the second optical unit 22, and the third optical unit 23 can be independently moved by a driving mechanism relative to one another. The fourth optical unit 24 is immovable. The scanning operation of this design is outlined hereinafter. In FIG. 2, the length of the scanning area is referenced by L, the second optical unit 22 is at ½L, the third optical unit 23 is at the zero point. When a fixed resolution scanning mode is selected, the lens 231 of the third optical unit 23 is immovable, therefore the image distance (the distance between the third optical unit 23 and the fourth optical unit 24) is fixed. The first optical unit 21 and the second optical unit 22 are moved at the velocity of 2:1, i.e., $V1=2V2$, in which V1 is the moving speed of the first optical unit 21, and V2 is the moving speed of the second optical unit 22. Therefore, the object distance is constantly maintained at the fixed value of L+1 during the scanning process. Please refer to FIG. 3. If $V1=V$, then $V2=½V$, and therefore after a length of time t in movement, the distance of displacement of the first optical unit $21=Vt$, and the distance of displacement of the second optical unit $22=½Vt$. When the distance between the first optical unit 21 and the second optical unit 22 is shortened by ½Vt, the distance between the second optical unit 22 and the third optical unit 23 is increased by ½Vt, and therefore the object distance does not change. After a length of time L/V in movement, the first optical unit 21 and the second optical unit 22 simultaneously reach L, as shown in FIG. 4, and the object distance is still maintained at L+1. Therefore, the object distance and the image distance do not change during scanning, and the image of the document can be accurately focused onto the CCD 241 of the fourth optical unit 24. Actually, when reached L, there is still a distance ΔL kept between the first optical unit 21 and the second optical unit 22. However, if the set position of the second optical unit 22 is shifted from ½L to ½L+ΔL originally, the final location of the second optical unit will be at L+ΔL, and the object distance will be changed from L+1 to L+1+2·ΔL (which is also a fixed value). Therefore, the image of the document can still accurately focused onto the CCD 241 of the fourth optical unit 24.

Figure 5A:
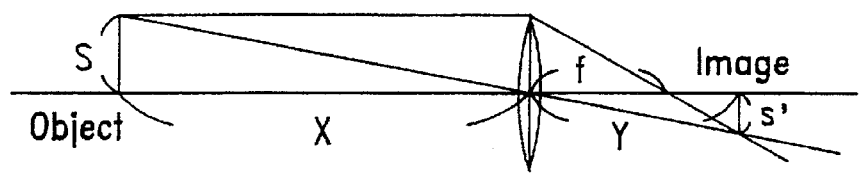
FIG. 5A is a schematic drawing explaining the adjustment of resolution (I)
Figure 5B:
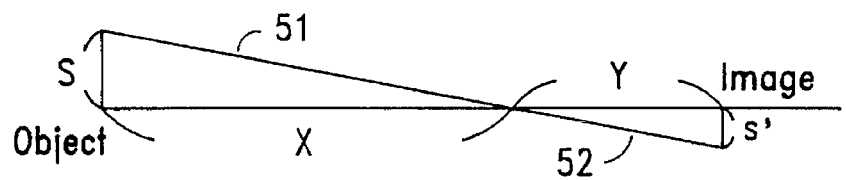
FIG. 5B is a schematic drawing explaining the adjustment of resolution (II)
Figure 6:
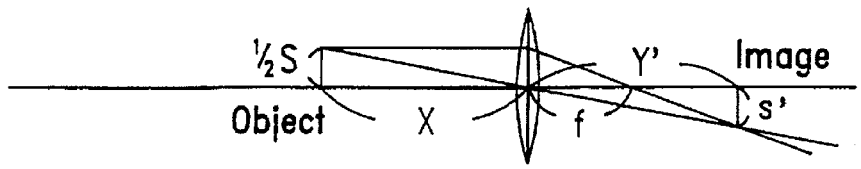
FIG. 6 is a schematic drawing explaining the image formation when the resolution doubled.

When the resolution is to be increased, the operation flow must be changed so as to maintain the image height on the CCD. Therefore, the width of the scanning area must be reduced by one half (the object height is reduced by one half) in order to double the resolution value. Because magnification=image height/object height, the magnification is doubled when the resolution is doubled. Therefore, the object distance and the image distance must be adjusted by changing the position of the second optical unit 22 and the third optical unit 23 respectively. The operation of such an adjustment is explained hereinafter with reference to FIGS. 5A, 5B, and 6. In FIGS. 5A and 5B:

X: object distance
Y: image distance
f: focal distance
S: object height
S': image height
m: magnification $$\frac{1}{X} + \frac{1}{Y} = \frac{1}{f}$$

$$\frac{S'}{S} = m$$

and because 51 and 52 are geometric triangles, $$\frac{Y}{X} = \frac{S'}{S} = m$$

Thus, to double the resolution and reduce the object height by one half without changing the image height, the values of X and Y must be changed to X' and Y'. Please refer to FIG. 6, for which the following new equations are obtained:

$$\frac{1}{X'} + \frac{1}{Y'} = \frac{1}{f}$$

$$\frac{Y'}{X'} = m' = 2m \rightarrow \frac{Y'}{X'} = 2 \cdot \frac{Y}{X}$$

Figure 7:
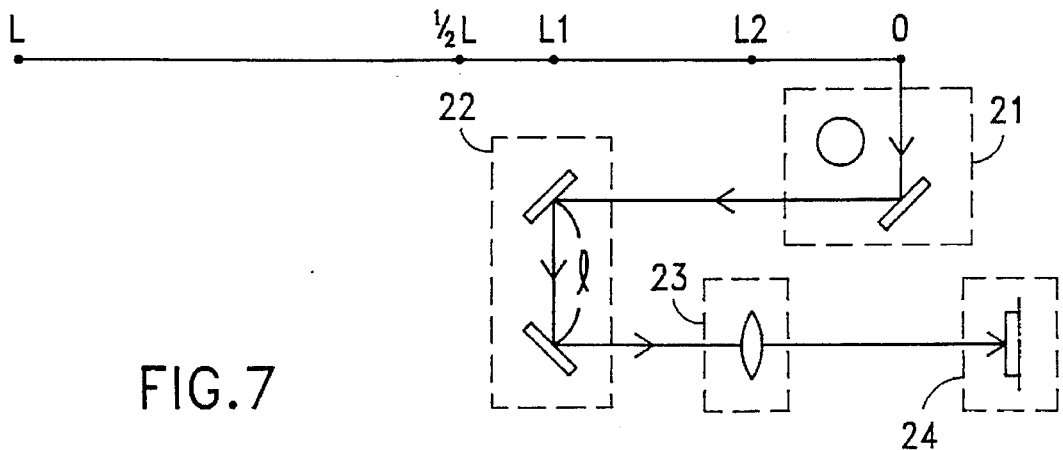
FIG. 7 is a schematic drawing showing the optical system of the present invention adjusted subject to FIGS. 5A, 5B and 6.

Because the values of X, Y and f are known, the values of X' and Y' can be obtained from the aforesaid equations. When the values of X' and Y' are obtained, the object distance and the image distance can be accurately adjusted. As illustrated in FIG. 7, the second optical unit 22 is moved to L1, the third optical unit 23 is moved to L2, the positions of the first optical unit 21 and the fourth optical unit 24 remain unchanged. When this adjustment is done, a two-time resolution scanning operation can then be executed. The scanning control mode remains unchanged (i.e., V1=2V2, and the positions of the third and fourth optical units remain unchanged). Therefore, a fixed object distance and a fixed image distance are obtained during the scanning process. However, the length of this adjusted scanning area is also relatively shorted to become 2·L1, i.e., the first optical unit 21 and the second optical unit 22 will simultaneously reach 2·L1 when the scanning process is finished. Thus, the object distance does not change. In real cases, the value of ΔL shall also be taken into account. However, this factor does not affect the accurate result.

As indicated above, the resolution can be increased during the scanning process by adjusting the ratio between the object distance and the image distance, but the scanning area is relatively reduced when increasing the resolution.

The increase in resolution can be set in the driver to a certain range, for example, a column having different set values such as 400 dpi, 500 dpi, 600 dpi, 800 dpi, etc. can be built into the driver for selection (400 dpi is the default value). When one set value is selected, the optical scanner will automatically adjust the positions of the reflectors and the lens relative to the CCD so that the object distance and the image distance can be maintained unchanged. The operation of such an adjustment can be controlled by the CPU (central processing unit) of the flatbed scanner. Furthermore, because the CCD 241 (the fourth optical unit 24) is immovable, other image signal transmission cables may be used instead of a flat cable.

It is to be understood that the drawings are designed for purposes of illustration only, and are not intended as a definition of the limits and scope of the invention disclosed.

We claim:

1. An optical system for a flatbed scanner, comprising:

a first optical unit to emit light onto a document and to reflect an image of said document;

a second optical unit to receive the reflected light from said first optical unit and to reflect the reflected light;

a third optical unit to receive the reflected light from said second optical unit and to send out the reflected light; and a fourth optical unit to receive the light from said third optical unit and to pick up the image from said document;

wherein said first optical unit, said second optical unit and said third optical unit are set independently to a distance relative to said fourth optical unit according to a chosen resolution, said first optical unit moving at a speed two times higher than a speed of said second optical unit.

2. The optical system of claim 1 wherein said first optical unit comprises at least one light source for emitting the light onto said document and a first reflector for reflecting light from said document.

3. The optical system of claim 1 wherein said second optical unit comprises at least a second reflector to reflect the light from said first optical unit and a third reflector to reflect the light from said second reflector.

4. The optical system of claim 1 wherein said third optical unit comprises at least one lens to focus the light from said second optical unit onto said fourth optical unit.

5. The optical system of claim 1 wherein said fourth optical unit comprises at least one charge-coupled device to receive light from said third optical unit and to pick up the image of said document.

6. The optical system of claim 1 wherein said settings of said first optical unit, said second optical unit and said third optical unit are independently controlled by a central processing unit.

7. The optical system of claim 6 wherein the movement of said first optical unit and said second optical unit are controlled by the central processing unit.

* * * * *